(12) United States Patent
Park

(10) Patent No.: US 9,544,850 B2
(45) Date of Patent: *Jan. 10, 2017

(54) ENHANCING PS-POLL FOR LOW-POWER WIFI

(71) Applicant: Intel Corporation, Santa Clara, CA (US)

(72) Inventor: Minyoung Park, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 51 days.

This patent is subject to a terminal disclaimer.

(21) Appl. No.: 14/483,783

(22) Filed: Sep. 11, 2014

(65) Prior Publication Data

US 2015/0131507 A1   May 14, 2015

Related U.S. Application Data

(63) Continuation of application No. 13/074,148, filed on Mar. 29, 2011, now Pat. No. 8,879,450.

(51) Int. Cl.
*H04H 20/71* (2008.01)
*H04W 52/02* (2009.01)
*H04W 4/06* (2009.01)
*H04W 48/12* (2009.01)
*H04L 12/18* (2006.01)

(52) U.S. Cl.
CPC ........... *H04W 52/0225* (2013.01); *H04W 4/06* (2013.01); *H04W 52/0219* (2013.01); *H04W 52/0222* (2013.01); *H04L 12/189* (2013.01); *H04W 48/12* (2013.01)

(58) Field of Classification Search
USPC ................................. 370/311, 312
See application file for complete search history.

(56) References Cited

U.S. PATENT DOCUMENTS 8,879,450 B2 * 11/2014 Park .................. H04W 52/0219 370/252

\* cited by examiner

*Primary Examiner* — Dang Ton
*Assistant Examiner* — Pamit Kaur

(57) ABSTRACT

After waking from a sleep mode, a wireless communication device may poll a network controller for any broadcast and/or multicast messages. The device and the network controller may agree to this arrangement ahead of time, so that the network controller will know to buffer such messages until the device requests them. A format for enabling this capability is described.

25 Claims, 5 Drawing Sheets

ENHANCING PS-POLL FOR LOW-POWER WIFI

CROSS-REFERENCE TO RELATED APPLICATIONS

The present application is a continuation of, claims the benefit of, and priority to earlier filed U.S. patent application Ser. No. 13/074,148, filed on Mar. 29, 2011, entitled "ENHANCING PS-POLL FOR LOW-POWER WIFI," the subject matter of which is hereby incorporated by reference in its entirety.

BACKGROUND

A wireless device waking from a power save mode may poll the network controller to see if the network controller has buffered unicast frames that are addressed solely for that wireless device. However, broadcast and multicast frames are not buffered until requested, but are transmitted immediately after DTIM beacons. Under current standards, if the wireless device is part of a multicast group it must wake up at every DTIM interval to receive any broadcast/multicast frames for its group. DTIM beacons are typically transmitted every 200-400 msec, requiring a wireless device in the power save mode to wake up every 200-400 msec to learn if it has any broadcast or multicast frames to receive. For wireless devices that communicate frequently, this may be a reasonable tradeoff between saving battery power and obtaining all such frames. But for battery-powered sensor devices that need to only wake up occasionally (e.g., tens of minutes to hours) to communicate sensor data, waking up multiple times per second can severely reduce battery life and thereby increase maintenance costs (e.g., replacing/recharging the battery frequently) or reduce product life (e.g., for disposable sensors when replacing/recharging the battery is not feasible).

BRIEF DESCRIPTION OF THE DRAWINGS

Some embodiments of the invention may be better understood by referring to the following description and accompanying drawings that are used to illustrate embodiments of the invention. In the drawings.

DETAILED DESCRIPTION

Figure 1:
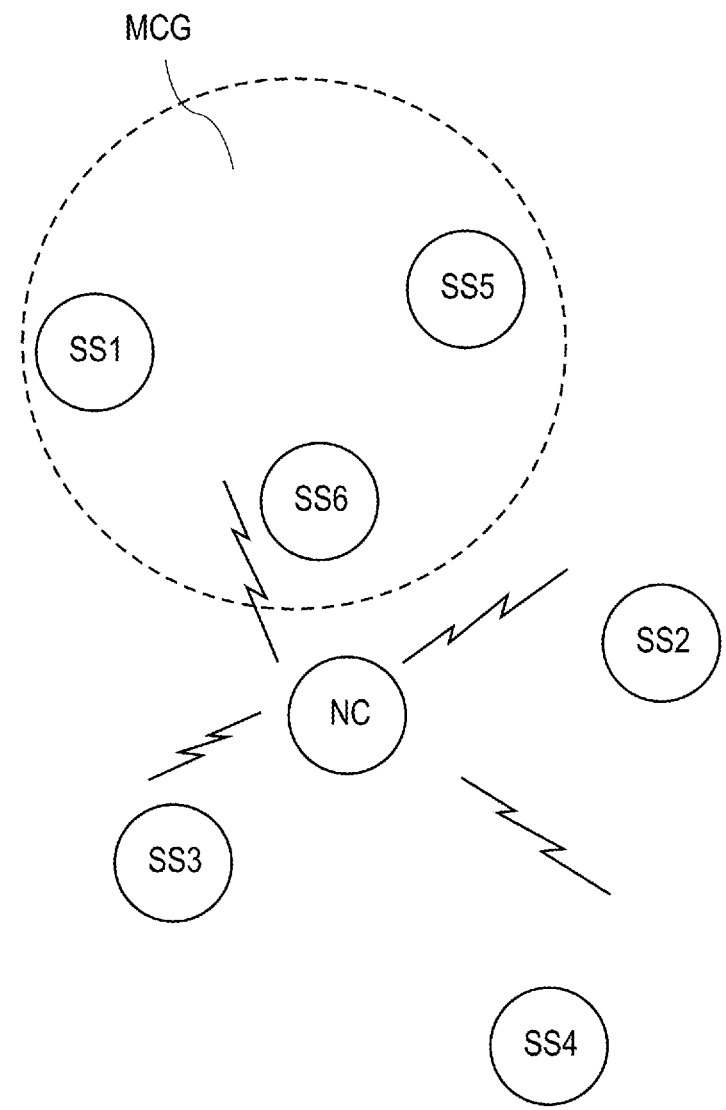
FIG. 1 shows a wireless communications network in which various communications devices communicate with each other wirelessly, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a non-transitory computer-readable medium, which may be read and executed by one or more processors to enable performance of the operations described herein. Such a computer-readable medium may include any tangible mechanism for storing information in a form readable by one or more computers, such as but not limited to read only memory (ROM); random access memory (RAM); magnetic disk storage media; optical storage media; a flash memory device, etc.

The term "wireless" may be used to describe circuits, devices, systems, methods, techniques, communications channels, etc., that communicate data by using modulated electromagnetic radiation through a non-solid medium. The term does not imply that the associated devices do not contain any wires. A wireless device may comprise at least one antenna, at least one radio, at least one memory, and at least one processor, where the radio transmits signals through the antenna that represent data and receives signals through the antenna that represent data, while the processor may process the data to be transmitted and the data that has been received. The processor may also process other data which is neither transmitted nor received.

As used within this document, the term "network controller" is intended to cover devices that schedule and control, at least partially, wireless communications by other devices in the network. A network controller may also be known as a base station (BS), access point (AP), central point (CP), or any other term that may arise to describe the functionality of a network controller.

As used within this document, the term "subscriber station" (SS) is intended to cover those devices whose wireless communications are at least partially scheduled and controlled by the network controller. A subscriber station may also be known as a mobile station (MS), mobile device (MD), STA, user equipment (UE), or any other term that may arise to describe the functionality of an SS. Some types of SS's may be able to communicate effectively while moving, but other may not.

As used within this document, a 'sleep mode' or 'sleep state' is a condition in which a wireless communications device may save power by shutting down enough operational functions that it cannot transmit or receive wireless communications. The various ways in which this shutdown may be accomplished are beyond the scope of this document.

Within this document, several types of addressing techniques are described, each indicating how the intended destination devices are indicated in the communication. A unicast address is an address intended to be recognized by a single destination device, and that destination device is the intended recipient of the packet that is so addressed.

A multicast address is an address intended to be recognized by multiple destination devices, and those destination devices are the intended recipients of the packet that is so addressed. One or more previous communications may need to take place to notify the SS's in a multicast group that they are a part of that group and are to recognize that multicast address, so that each will receive the packet. Some packets may contain multiple unicast addresses, with each addressed device expected to recognize and receive the same packet. For the purposes of this document, these are considered multicast packets, since the effect is the same except that each device doesn't have to recognize two different addresses (its own and the multicast address).

A 'broadcast' packet is a packet that is intended to be received by any device that is able to receive it. A broadcast packet may typically contain all 1's as a destination address, indicating to all receivers it is intended as a broadcast. However, in other embodiments, other techniques may be used to indicate a broadcast.

A group-addressed packet is a packet that is a multicast packet or a broadcast packet, but is not a unicast packet.

FIG. 1 shows a wireless communications network in which various communications devices communicate with each other wirelessly, according to an embodiment of the invention. A network controller NC may provide overall control for communications in the network. In the illustrated embodiment, subscriber stations SS1-SS6 are associated with network controller NC, which has combined SS1, SS5, and SS6 into a multicast group MCG that will all recognize and respond to the same multicast address. (For ease of illustration, the members of the multicast group are all shown in close physical proximity, but this may not be necessary or typical.) In some embodiments the NC may transmit and receive in an omni-directional manner, while in other embodiments the NC may use more directional communications. In some embodiments, some or all of the SS's may be battery powered sensor devices that report on various sensed parameters at widely spaced intervals in time, but this should not be considered a limitation.

Figure 2:
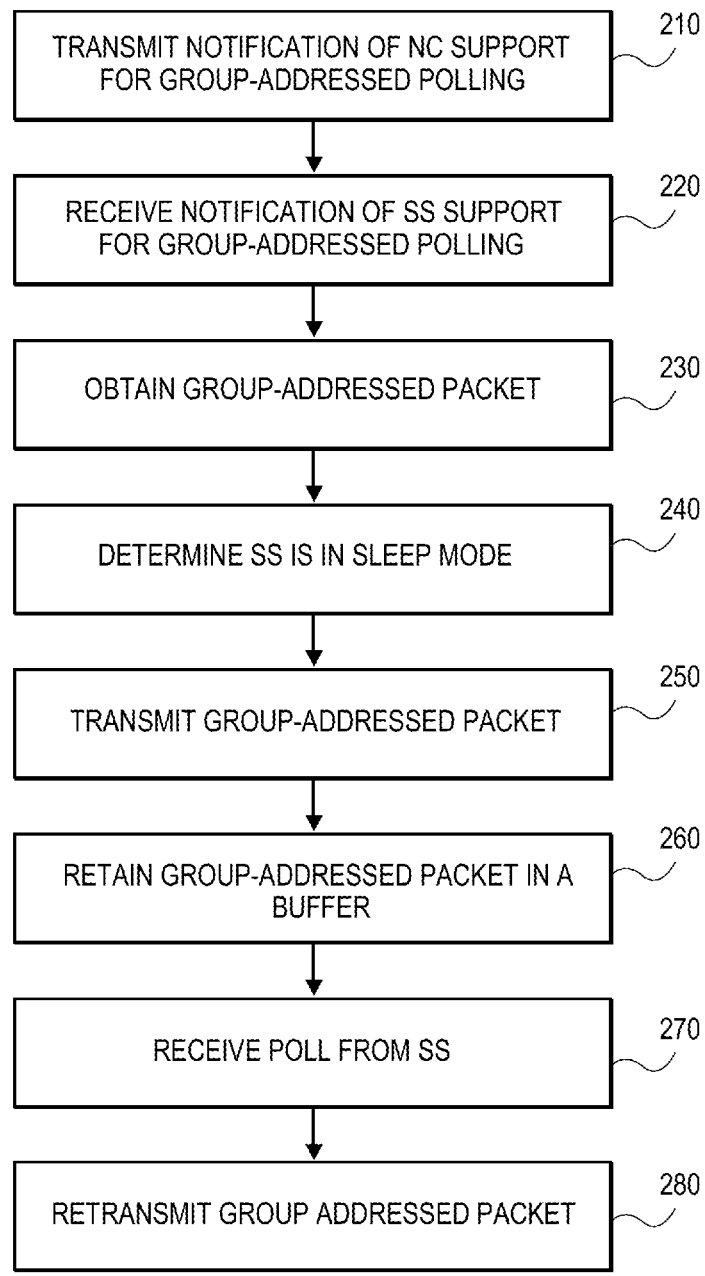
FIG. 2 shows a flow diagram of a method followed by a network controller to perform group-addressed polling communication involving a sleep mode, according to an embodiment of the invention.

FIG. 2 shows a flow diagram of a method followed by a network controller to perform group-addressed polling communication involving a sleep mode, according to an embodiment of the invention. This procedure may allow the network controller to announce that it supports such communication, learn that a particular SS intends to use it, and then perform the required operations with that SS. The process may begin at 210 when the NC transmits a notification that it supports the group-addressed polling techniques described herein. Such notification may take any feasible form, such as in a beacon, a probe response, or as part of the association process, but other forms may also be used without departing from the scope of various embodiments of the invention.

At 220 the NC may receive notification from a particular SS that the SS also supports this group-addressed polling and agrees to use it. Again, this notification may take any feasible form, such as in a response to a beacon or as part of the association process, but other forms may also be used without departing from the scope of various embodiments of the invention. In general, if either of these notifications is not received, the described group-addressed polling technique will not be used for communications between these two devices.

Subsequent to the agreement established at 210, 220, the NC may obtain a group-addressed packet at 230 that is destined for a group of SS's that includes the particular SS. This group-addressed packet may be obtained in any feasible manner, such as being received from another device for forwarding to the group, being assembled by the NC from various other received packets, or being constructed from information that the NC initiates.

If the particular SS is awake and able to receive the group-addressed packet, the SS may transmit the group-addressed packet and assume that every SS in the group, including the particular SS, is able to receive it. However, at 240 the NC may determine that the particular SS is in a sleep mode and will therefore not be able to receive the transmitted packet. Such determination may be accomplished in any feasible manner, but one technique is for the particular SS to notify the NC that the particular SS is entering a sleep mode. The particular SS may or may not include information about how long the sleep mode will last.

Even if the particular SS is in a sleep mode, the NC may transmit the group-addressed packet at 250 for the benefit of the other SS's in the group that are awake and able to receive the packet. The NC may then retain the packet in a buffer at 260 for a subsequent retransmission.

Some time later, at 270 the NC may receive a poll from the particular SS requesting any buffered packets that the NC has waiting for that SS. This is a notification that the SS is now awake and ready to receive those packets. In a conventional system, only unicast packets would have been buffered, but in this system the group-addressed packets were also buffered. So in addition to transmitting the buffered unicast packets in response to this poll, the NC may also transmit the buffered group-addressed packets at 280.

At some point, the retained group-addressed packets may be deleted from the buffer. In some embodiments, a previously established time period may be communicated that defines the maximum time period the retained packets can remain in the buffer before being deleted. If the SS does not wake up and request those packets before the expiration of that time period, they may be deleted from the buffer and the SS may not be able to receive them at all. On the other hand, if the SS wakes up and requests those packets before expiration of the maximum time period, the NC may delete the retained packet from the buffer after the packet is retransmitted, even if the time period has not expired.

Figure 3:
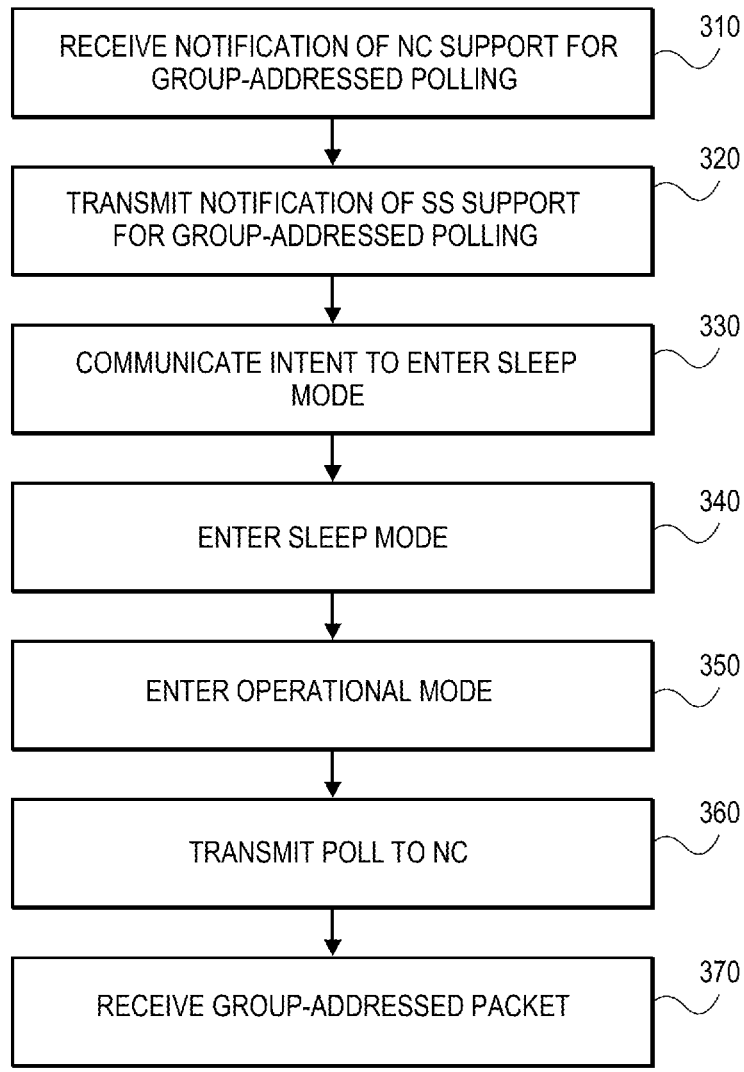
FIG. 3 shows a flow diagram of a method followed by a subscriber station to perform group-addressed polling communication involving a sleep mode, according to an embodiment of the invention.

FIG. 3 shows a flow diagram of a method followed by a subscriber station to perform group-addressed polling communication involving a sleep mode, according to an embodiment of the invention. This process may be complementary to the process followed by the NC in FIG. 2. The process may begin at 310 when the SS receives a notification from the NC that the NC supports the group-addressed polling techniques described herein. Such notification may take any feasible form, such as in a beacon, a probe response, or as part of the association process, but other forms may also be used without departing from the scope of various embodiments of the invention.

At 320 the SS may transmit a notification to the NC that it also supports such group-addressed polling and may follow that procedure when waking from subsequent sleep states. Again, this notification may take any feasible form. Both notifications may be needed before the group-addressed polling techniques will be used by these two devices.

Later, when the SS has no data to communicate, it may enter a sleep mode at 340. In some embodiments it may first notify the NC at 330 that it is entering the sleep mode. After a sufficient period of time in the sleep mode, the SS may wake up and enter an operational mode at 350. Various techniques may be used to determine how long the SS is in the sleep mode. Those techniques are beyond the scope of this document, and are not further discussed here.

After waking, the SS may transmit a poll to the NC at 360, requesting any buffered packets that the NC has waiting for the SS, and at 370 it may receive the buffered group-addressed packets in response to that poll. In some embodiments, a single poll may request both unicast and group-addressed packets, but in other embodiments each type of packet may require a separate poll.

Figure 4:
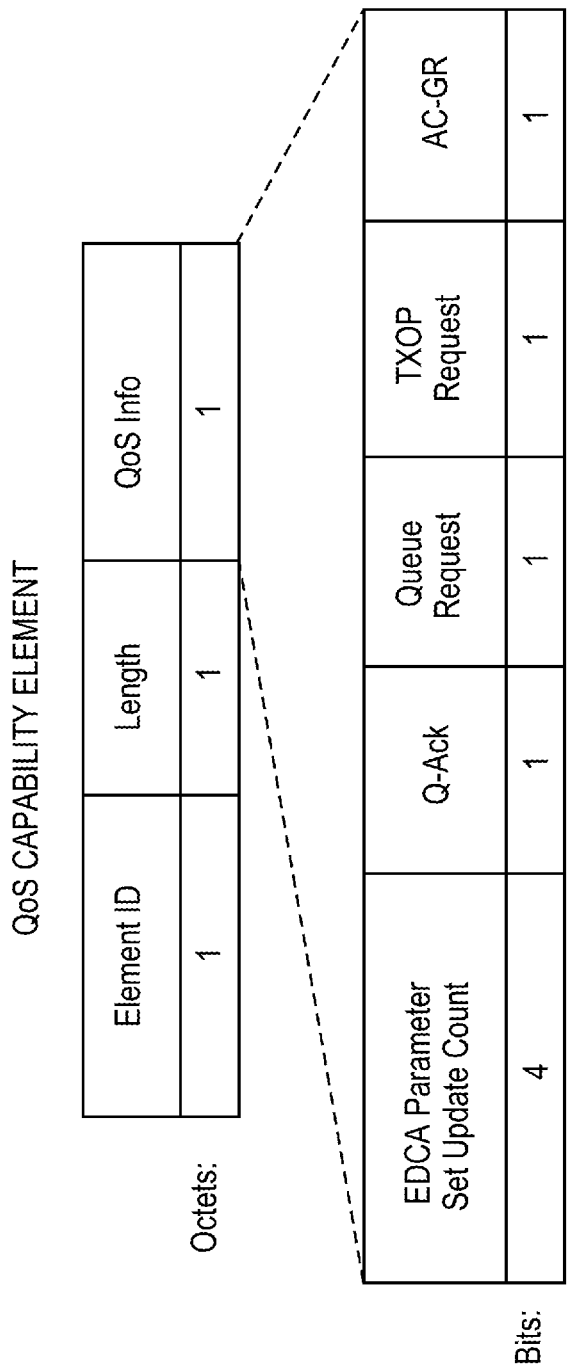
FIG. 4 shows a format for indicating support by a network controller for group-addressed polling techniques involving a sleep mode by a subscriber station, according to an embodiment of the invention.

FIG. 4 shows a format for indicating support by a network controller for group-addressed polling techniques involving a sleep mode by a subscriber station, according to an embodiment of the invention. The indicated information may be transmitted in the form of an Information Element (IE), with the format of an Element ID, a Length field, and a Data field that carries the contents of the IE that are being conveyed. In many cases the Data field may have a variable length, so the Length field may define where the IE ends. The Element ID may define the type of IE it is, which in turn defines how the contents of the Data field should be interpreted. In the particular IE shown in the upper part of FIG. 4, labeled as a QoS Capability Element, the Data field is indicated as a QoS Info field, whose contents are further defined in the lower part of FIG. 4. The flexible nature of IEs allows them to be inserted into various types of packets.

In previous versions of a QoS Info subfield of a QoS Capability Element, the final bit has been reserved for unspecified future use. In this embodiment, that bit is being used to indicate that the NC supports group-addressed polling techniques. The label AC-GR is shown (Access Category—GRoup addressed frame), but any suitable label may be used. The bit being in one state indicates the NC supports this technique, while the bit being in the other state indicates the NC does not. The remaining fields are not part of communicating this capability, may take other forms, and are not further described.

Figure 5:
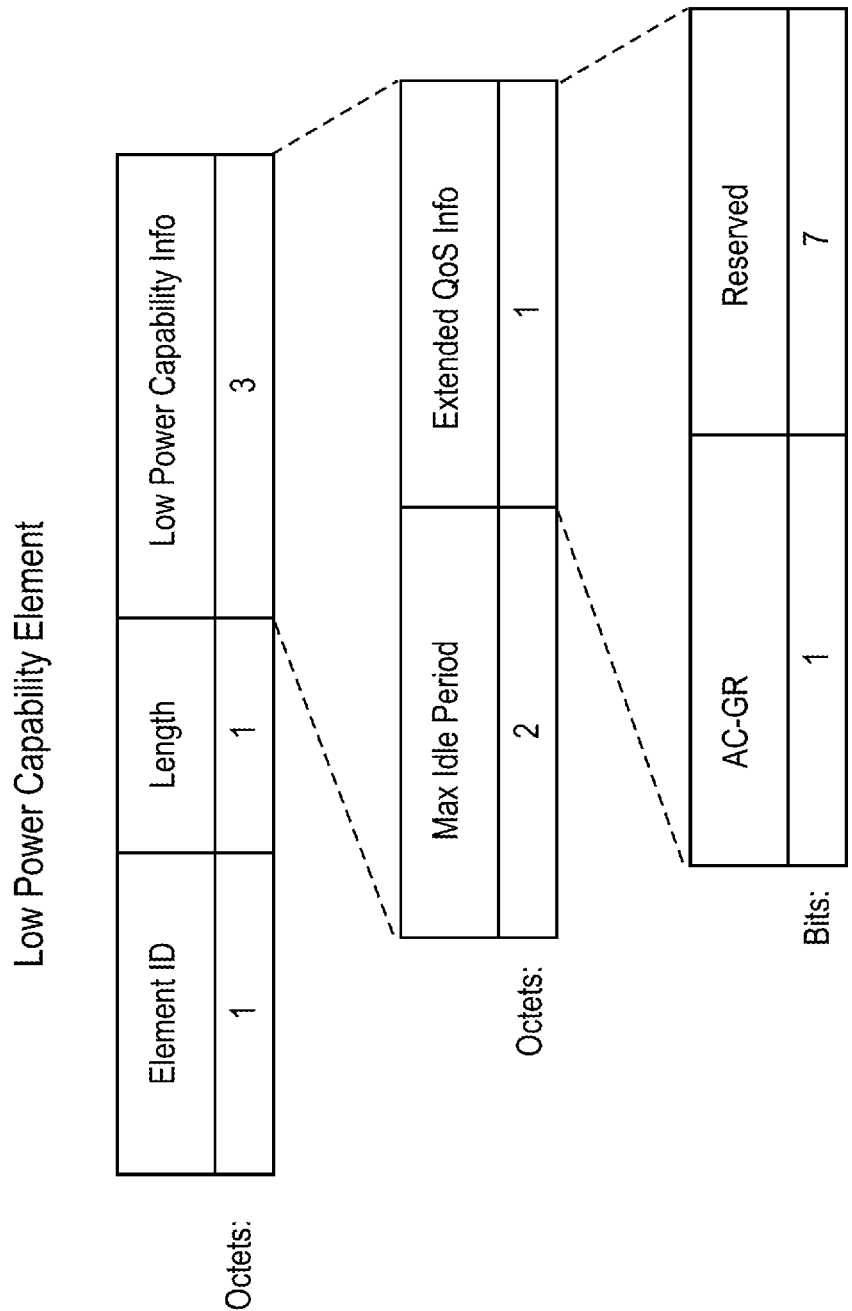
FIG. 5 shows a format for indicating support by a subscriber station for group-addressed polling techniques involving a sleep mode, according to an embodiment of the invention.

FIG. 5 shows a format for indicating support by a subscriber station for group-addressed polling techniques involving a sleep mode, according to an embodiment of the invention. The indicated information may be transmitted in the form of an Information Element (IE), whose general format was covered in the description for FIG. 4. The illustrated IE in FIG. 5 is labeled a Low Power Capability Element, and the Data field is labeled a Low Power Capability Info field, although other labels may be used instead. The contents of the Low Power Capability Info field are shown as containing a Max Idle Period field and an Extended QoS Info field. The Max Idle Period field may indicate the maximum period the NC may wait before deleting retained packets from its buffer. The Extended QoS Info field may contain the AC-GR indicator. As indicated in FIG. 4, this bit may be used to show whether or not the transmitting device supports group-addressed polling techniques as described in this document.

If the NC shows it supports group-addressed polling techniques as described in FIG. 4, and the SS shows it supports group-addressed polling techniques as described in FIG. 5, then the NC may retain group-addressed packets intended for the SS, and the SS may poll for those retained packets after awaking from a sleep state. If either the NC or SS does not show such support, then this technique may not be used. In such a case, the SS may wake up for each DTIM interval to listen for any group-addressed packets, and polls by the SS make only retrieve retained unicast packets.

The foregoing description is intended to be illustrative and not limiting. Variations will occur to those of skill in the art. Those variations are intended to be included in the various embodiments of the invention, which are limited only by the scope of the following claims.

What is claimed is:

1. A network controller, comprising:
processing circuitry; and
logic, at least a portion of which is in hardware, the logic to send a first notification indicating that the network controller supports group-addressed polling, receive a second notification indicating that a subscriber station (SS) is to use group-addressed polling, buffer a group-addressed packet in response to a determination that the group-addressed packet is addressed to a multicast group (MCG) that comprises the SS and a determination that the SS is in a sleep state, and send the group-addressed packet while the SS is in the sleep state.

2. The network controller of claim 1, the logic to determine whether to retransmit the group-addressed packet based on whether a request for retransmission of the group-addressed packet is received prior to an expiration of a time period during which the group-addressed packet is permitted to remain in a buffer.

3. The network controller of claim 2, the logic to delete the group-addressed packet from the buffer without retransmitting the group-addressed packet in response to a determination that the time period has expired and that no request for retransmission of the group-addressed packet has been received.

4. The network controller of claim 2, the logic to retransmit the group-addressed packet in response to receipt of a poll prior to the expiration of the time period, the poll to comprise a request for retransmission of any buffered packets addressed to the SS.

5. The network controller of claim 4, the logic to buffer one or more unicast packets that are addressed to the SS in response to the determination that the SS is in the sleep state and transmit the one or more unicast packets in response to receipt of the poll.

6. The network controller of claim 1, the first notification comprised in a beacon or a probe response.

7. The network controller of claim 1, the second notification comprised in a received response to a beacon.

8. The network controller of claim 1, the logic to transmit the first notification and receiving the second notification during an association process for the SS.

9. The network controller of claim 1, comprising:
at least one radio; and
at least one antenna.

10. At least one non-transitory computer-readable storage medium comprising a set of instructions that, in response to being executed at a network controller, cause the network controller to:
- transmit a first notification indicating that the network controller supports group-addressed polling;
- receive a second notification indicating that a subscriber station (SS) is to use group-addressed polling;
- buffer a group-addressed packet in response to a determination that the group-addressed packet is addressed to a multicast group (MCG) that comprises the SS and a determination that the SS is in a sleep state; and
- transmit the group-addressed packet while the SS is in the sleep state.

11. The at least one non-transitory computer-readable storage medium of claim 10, comprising instructions that, in response to being executed at the network controller, cause the network controller to determine whether to retransmit the group-addressed packet based on whether a request for retransmission of the group-addressed packet is received prior to an expiration of a time period during which the group-addressed packet is permitted to remain in a buffer.

12. The at least one non-transitory computer-readable storage medium of claim 11, comprising instructions that, in response to being executed at the network controller, cause the network controller to delete the group-addressed packet from the buffer without retransmitting the group-addressed packet in response to a determination that the time period has expired and that no request for retransmission of the group-addressed packet has been received.

13. The at least one non-transitory computer-readable storage medium of claim 11, comprising instructions that, in response to being executed at the network controller, cause the network controller to retransmit the group-addressed packet in response to receipt of a poll prior to the expiration of the time period, the poll to comprise a request for retransmission of any buffered packets addressed to the SS.

14. The at least one non-transitory computer-readable storage medium of claim 13, comprising instructions that, in response to being executed at the network controller, cause the network controller to:
- buffer one or more unicast packets that are addressed to the SS in response to the determination that the SS is in the sleep state; and
- transmit the one or more unicast packets in response to receipt of the poll.

15. The at least one non-transitory computer-readable storage medium of claim 10, the first notification comprised in a beacon or a probe response.

16. The at least one non-transitory computer-readable storage medium of claim 10, the second notification comprised in a received response to a beacon.

17. The at least one non-transitory computer-readable storage medium of claim 10, comprising instructions that, in response to being executed at the network controller, cause the network controller to transmit the first notification and receiving the second notification during an association process for the SS.

18. A method, comprising:
- transmitting, by one or more antennas of a network controller (NC), a first notification indicating that the NC supports group-addressed polling;
- receiving a second notification indicating that a subscriber station (SS) is to use group-addressed polling;
- buffering a group-addressed packet in response to a determination that the group-addressed packet is addressed to a multicast group (MCG) that comprises the SS and a determination that the SS is in a sleep state; and
- transmitting the group-addressed packet while the SS is in the sleep state.

19. The method of claim 18, comprising determining whether to retransmit the group-addressed packet based on whether a request for retransmission of the group-addressed packet is received prior to an expiration of a time period during which the group-addressed packet is permitted to remain in a buffer.

20. The method of claim 19, comprising deleting the group-addressed packet from the buffer without retransmitting the group-addressed packet in response to a determination that the time period has expired and that no request for retransmission of the group-addressed packet has been received.

21. The method of claim 19, comprising retransmitting the group-addressed packet in response to receipt of a poll prior to the expiration of the time period, the poll comprising a request for retransmission of any buffered packets addressed to the SS.

22. The method of claim 21, comprising:
- buffering one or more unicast packets that are addressed to the SS in response to the determination that the SS is in the sleep state; and
- transmitting the one or more unicast packets in response to receipt of the poll.

23. The method of claim 18, the first notification comprised in a beacon or a probe response.

24. The method of claim 18, the second notification comprised in a received response to a beacon.

25. The method of claim 18, comprising transmitting the first notification and receiving the second notification during an association process for the SS.

* * * * *